United States Patent
Tiwari et al.

(10) Patent No.: US 11,324,232 B2
(45) Date of Patent: May 10, 2022

(54) ISOELECTRIC SOLUBILISATION OF ANIMAL MATTER

(71) Applicant: Agriculture and Food Development Authority (Teagasc), County Carlow (IE)

(72) Inventors: Brijesh K. Tiwari, Dublin (IE); Carlos Alvarez Garcia, Dublin (IE); Declan Troy, Dublin (IE)

(73) Assignee: AGRICULTURE AND FOOD DEVELOPMENT AUTHORITY (TEAGASC), County Carlow (IE)

(*) Notice: Subject to any disclaimer, the term of this patent is extended or adjusted under 35 U.S.C. 154(b) by 590 days.

(21) Appl. No.: 15/744,738

(22) PCT Filed: Jul. 15, 2016

(86) PCT No.: PCT/EP2016/066992
§ 371 (c)(1),
(2) Date: Jan. 12, 2018

(87) PCT Pub. No.: WO2017/013043
PCT Pub. Date: Jan. 26, 2017

(65) Prior Publication Data
US 2018/0199590 A1    Jul. 19, 2018

(30) Foreign Application Priority Data
Jul. 17, 2015 (EP) .................. 15177341

(51) Int. Cl.
*A23J 1/00* (2006.01)
*A23J 1/02* (2006.01)
*A23J 1/04* (2006.01)

(52) U.S. Cl.
CPC .......... *A23J 1/002* (2013.01); *A23J 1/02* (2013.01); *A23J 1/04* (2013.01)

(58) Field of Classification Search
None
See application file for complete search history.

(56) References Cited

U.S. PATENT DOCUMENTS

| 5,384,149 A | 1/1995 | Lin |
| 6,005,073 A | 12/1999 | Hutlin et al. |

(Continued)

FOREIGN PATENT DOCUMENTS

WO    2017013043 A1    1/2017

OTHER PUBLICATIONS

Ghaly et al., "Fish Processing Wastes as a Potential Source of Proteins, Amino Acids and Oils: A Critical Review". Journal of Microbial and Biochemical Technology, vol. 5(4), pp. 107-129 (2013). (Year: 2013).*

(Continued)

*Primary Examiner* — Erik Kashnikow
*Assistant Examiner* — Assaf Zilbering
(74) *Attorney, Agent, or Firm* — Hamilton, Brook, Smith & Reynolds, P.C.

(57) ABSTRACT

A method of sequential isoelectric solubilisation of animal by-product comprising the steps of isoelectric solubilisation of the animal by-product in one of an acid or alkali solution to provide a first solubilised protein fraction, separating the first solubilised protein fraction from unsolubilised animal by-product, isoelectric solubilisation of the unsolubilised animal by-product to provide a second solubilised protein fraction, and separation of the second solubilised protein fraction from unsolubilised animal by-product. The protein from the first and/or second solubilised protein fractions is recovered by drying or precipitation. In one embodiment, the acid and alkali soluble protein fractions are proportionally combined to neutralise the composite fraction and precipitate protein.

9 Claims, 2 Drawing Sheets

(56) References Cited

U.S. PATENT DOCUMENTS

| | | |
|---|---|---|
| 6,451,975 B1 | 9/2002 | Hultin et al. |
| 7,763,717 B1 * | 7/2010 | Jaczynski ............... A23J 1/002 |
| | | 530/412 |
| 2011/0177582 A1 | 7/2011 | Trass et al. |
| 2012/0171345 A1 | 7/2012 | Kelleher et al. |
| 2012/0171352 A1 | 7/2012 | Kelleher et al. |

OTHER PUBLICATIONS

Tian et al., "Recovery of Rilapia (Oreochromis niloticus) Protein Isolate by High-intensity Ultrasound-Aided Alkaline Isoelectric Solubilization/Process". Food Bioprocess Technology vol. 8, pp. 758-769. (Year: 2014).*

Batista, "Recovery of Proteins from Fish Waste Products by Alkaline Extraction". Eur Food Res. Technology (1999) 210:84-89. (Year: 1999).*

International Search Report and Written Opinion for International Application No. PCT/EP2016/066992, dated Sep. 14, 2016.

Hultin H. O. et al.: "A re-examination of muscle protein solubility;" Journal of Muscle Foods, vol. 6, No. 2, Jan. 1, 1995; pp. 91-107.

* cited by examiner

ISOELECTRIC SOLUBILISATION OF ANIMAL MATTER

This application is the U.S. National Stage of International Application No. PCT/EP2016/066992, filed on Jul. 15, 2016, which designates the U.S., published in English, and claims priority under 35 U.S.C. §§ 119 or 365(c) to European Application No. 15177341.3, filed on Jul. 17, 2015. The entire teachings of the above applications are incorporated herein by reference.

TECHNICAL FIELD

The invention relates to methods for recovering protein from proteinaceous animal material, especially animal by-products such as heads, wings, tails, and internal organs. In particular, the invention relates to a method for recovering protein from fish waste.

BACKGROUND TO THE INVENTION

Current state of the art provides several alternative methods for protein recovery: enzymatic extraction, water extraction (surimi-like technique), isoelectric solubilisation precipitation methodology (ISP) or ISP assisted by US (ultrasound). Enzymatic extraction has the disadvantage of reagent cost and time employed to reach good yields, moreover the protein is recovered in the form of peptides which have very poor textural properties. In contrast to peptides, native proteins show good functional properties such as gelation, emulsifying, solubility and rheological, and these are highly valued in the food industry as they can be utilised as gelling agents. When water extraction is employed the product has good textural properties, but the yield is very low and the water employed could be as high as 20 times the weight of raw material, which requires a very high water consumption. Finally, ISP allows recovery of protein in a short time, but the yield is relatively low compared to enzymatic extraction, and current ISP technology is not able to recover all the protein present in raw material.

ISP involves the homogenization of raw material in acid (pH: 1-2) or alkaline (pH: 10-11) solution to solubilise proteins. Once the protein has been solubilized the aqueous phase can be separated by centrifugation or decantation and soluble and non-soluble molecules are separated. The last step includes the neutralization of the aqueous phase to a final pH value of 5.5 when previously solubilized proteins are precipitated and they are easily recovered by centrifugation or decantation.

Generally, in the literature, protein yields reported for ISP tend to vary in the range of 42% to 90%. Differences can be attributed to the method used for protein determination, fish species, centrifugation force used and relative concentration of water-soluble sarcoplasmatic proteins, which are only partly recovered using ISP (Chen, Tou et al. 2007; Chen, Tou et al. 2009). Kristinsson and Demmir (Kristinsson, Theodore et al. 2005) employed catfish, Spanish mackerel, croaker and mullet as raw material. Using acid solubilization the yield obtained was 71.5, 73.6, 81.2 and 78.7% respectively; when alkaline solubilization was used the recovered protein was 70.3, 69.3, 58.9 and 65.0%. In spite of the above results, generally alkaline solubilisation usually results in higher protein recoveries than acidic treatments (Gehring, Gigliotti et al. 2011).

US has been reported as an enhancer of ISP yield due to the ability of US to disrupt the matrix so that the protein is released and it increases the mass transfer between sample and buffer used for extraction. US is applied by submerging a US probe in the reaction medium or by placing the sample in a US water bath. US probes are advantageous over US water baths as the amount of energy released is higher, and can be controlled. The highest yields were found when a specific ultrasonic frequency and power level was used compared to the conventional extraction process using acid or alkali extraction without US. Application of US can be advantageous when proteins are extracted from complex matrices such as boned meat or meat by-products. US can also be applied in order to minimize water consumption in the ISP process, since as the mass transfer is increased, the ratio of solvent/sample employed is slightly lower (form 1:10 to 1:7 or 1:8). In addition, the pH of the extraction buffer can be a point closer to neutral pH while maintaining yield, allowing a saving of reagents, thus creating an environmentally-friendly and sustainable process, for protein recovery from by-products, since the amount of water employed can be notably reduced (by at least 30-40%) and the use of reagents reduced by around 40%, as reported by Tian et al. (2014).

Recent advances using alkaline ISP assisted by US extraction in tilapia (Tian, Wang et al. 2014), reported a recovery value of 62%, which was notably improved when compared with conventional ISP (47%).

STATEMENTS OF INVENTION

The present invention involves the use of improved sequential extraction based on isoelectric solubilisation methodology. Briefly, once the first extraction (alkaline or acid) has been carried out, the remaining precipitate can still be rich in protein since all proteins cannot be solubilized in a single step. The Applicant has shown (based on size exclusion chromatographic profiles of extracted proteins) that certain proteins extracted at alkaline pH are not extracted under acidic conditions and vice versa and that employing a second extraction process after pH shifting (using acid or alkali, depending on what was used in the first step) can extract further protein, thereby increasing protein yield. Using conventional one-step ISP alone, the results below show that solubilization of total protein from mackerel by-products under alkaline conditions is 67%, and under acid solubilisation is 56%. By applying sequential isoelectric solubilisation extraction to the same raw material (i.e. mackerel by-products) however, the results show that recovery of approximately 98% of total protein is possible, a dramatic increase in extraction yield, employing the same amount of reagents as in conventional ISP.

Broadly, the invention provides a method of recovery of protein from animal by-productf by sequential isoelectric solubilisation of the animal by-product the method comprising the steps of:
  isoelectric solubilisation of the animal by-product in one of an acid or alkali solution to provide a first solubilised protein fraction;
  separating the first solubilised protein fraction from unsolubilised animal matter;
  isoelectric solubilisation of the unsolubilised animal matter to provide a second solubilised protein fraction;
  separating the second solubilised protein fraction from unsolubilised animal matter; and
  optional recovery of protein from the first and/or second solubilised protein fractions.

Thus, the first isoelectric solubilisation step may be carried out in acid solution and the second isoelectric solubilisation step carried out in alkali solution, or vica-versa. The first solubilisation step provides a precipitate of unsolubilised matter and a supernatant containing a first solubilised protein fraction, and the second solubilisation step is carried out on the precipitate from the first step, and solubilises proteins that are not solubilised in the first step. In this way, a far greater proportion of the high value protein is recovered.

The method of the invention generally involves treating one or both of the solubilised protein fractions to recover protein.

In one embodiment, the soluble protein fractions are combined.

Protein may be recovered by precipitation, or dehydration. The end product of protein recovery may be a powder, or a paste, or a concentrated protein solution. The protein may be precipitated by altering the pH of the solution, for example by neutralisation or the acid or alkali protein fraction. Generally, the precipitate is dried after precipitation. Dehydration of the protein fractions may be achieved by any means known in the art, for example by means of drum drying, spray drying, or by means of evaporation.

In one embodiment, the precipitated protein is washed to remove salt. In one embodiment, the precipitated protein is washed in slightly acidic water (i.e. pH 5-6).

A further advantage of sequential extraction is that both acid and alkaline supernatants can be mixed to bring the pH to the pI of the protein, so that the extracted protein can be precipitated and easily recovered. In one embodiment, both supernatants rich in soluble proteins are mixed in the right proportion to get a final blend with a pH value that promotes precipitation of solubilised protein, for example a pH of 5.5.

Thus, in one embodiment, the protein from the first and second solubilised protein fractions are recovered by combining the first and second solubilised protein fractions in a proportion to effect precipitation of the protein. Thus, the acid and alkali supernatants are combined in amounts to effect precipitation. In one embodiment, the first and second solubilised protein fractions are combined proportionally to provide a weakly acidic solubilised protein fraction having a pH of 5-6. In one embodiment, the first and second solubilised protein fractions are combined proportionally to provide a weakly acidic solubilised protein fraction having a pH of approximately 5.5.

In one embodiment, the animal by-product is fish by-product.

In one embodiment, the animal by-product is treated with ultrasound during one or both of the isoelectric solubilisation steps.

In one embodiment, the isoelectric solubilisation steps are carried out in a stirred reactor.

In one embodiment, the solubilised protein fraction is separated from the unsolubilised animal by-product by means of centrifugation. Other means of separation may be employed, including filtration, or membrane separation (microfiltration or ultrafiltration).

In one embodiment, the first isoelectric solubilisation step is carried out on a first batch of animal by-product, and the second isoelectric solubilisation step is carried out on unsolubilised animal by-product from a second batch of animal by-product, and wherein the two isoelectric solubilisation steps are carried out simultaneously.

In one embodiment, the animal by-product is size-reduced prior to the isoelectric solubilisation step. Various size-reduction steps are envisaged including mincing or homogenisation, depending on the nature of the animal by-product.

DEFINITIONS

"Sequential isoelectric solubilisation" should be understood to mean a process comprising a first isoelectric solubilisation step which produces a precipitate of unsolubilised material, and a second isoelectric solubilisation step carried out on the precipitate produced in the first isoelectric solubilisation step. The first step may be acid solubilisation and the second step alkali solubilisation, or the first step may be alkali solubilisation and the second step acid solubilisation.

"Isoelectric solubilisation" means exposing animal matter to an acid or alkali solution for a period of time sufficient to allow isoelectric solubilisation of at least a part of the protein in the animal matter. Generally, each isoelectric solubilisation step is carried out for at least 5, 10 or 15 minutes.

"Animal by-product" means proteinaceous material obtained from animals such as mammals or fish suitable for processing for recovery of protein, for example matter derived from fish, crustacean, snails, whelks, beef, pig, chicken, goat, deer or any other animal. Typically, the animal by-product is obtained from an animal processing plant, after the high value meat has been removed, and includes heads, internal organs, tails. In a preferred embodiment, the animal matter is fish matter. In this case, the by-product generally includes heads, internal organs, tails, fins, frames and skin.

"Acid solution" means a solution having a pH of less than 5, and generally having a pH of 1-4, preferably 2-3. It will generally be a strong acid solution. Examples of acid solutions include several molarities of mineral or organic acids. Typically, the acid solution has a concentration of 0.1-0.4 moles/litre, generally the concentration required to reach the desired value, typically 2-3. In one embodiment, the acid is selected from hydrochloric acid, phosphoric acid, citric acid, sulphuric acid or acetic acid.

"Alkali solution" means a solution having a pH of greater than 8, and generally having a pH of 9-12, preferably 10-11. It will generally be a solution of a caustic compound. Typically, the alkali solution has a concentration of 0.1-0.4 moles/litre. Typically the alkali is selected from calcium hydroxide, sodium hydroxide, potassium hydroxide or ammonium hydroxide.

"Solubilised protein fraction" means a fraction containing solubilised protein and substantially free of unsolubilised matter. Generally, the solubilised protein fraction is separated from the unsolubilised material using well known separation techniques, such as filtration, decantation, or membrane separation. Examples of membrane separation include microfiltration and ultrafiltration.

"Recovery of protein" includes both concentration of the solubilised fraction, drying of the solubilised protein fraction, or isolation of protein by for example precipitation. In one embodiment, protein recovery is achieved by means of precipitation. Drying can be achieved by evaporation, spray drying, lyophilisation, or other means including nanofiltration.

"Stirred reactor" is composed of a tank or container and a mixer such as a stirrer, a turbine wing or a propeller.

"Size-reduced" means treating the animal material to reduce the size of the material. Examples of size-reduction processes include mincing, homogenisation and milling. Generally, when the material is homogenised, it is homogenised in an acid or alkali solution.

DETAILED DESCRIPTION OF THE INVENTION

The fish industry produces large amounts of by-products and waste following selection of the fillets. Most of these by-products are rich in good quality protein, but currently they are underutilised and millions of tons of protein are lost every year. The present invention proposes a method capable of recovering more than 95% of the protein content in such by-products, a significant improvement on existing methods, using a fast (30-40 minutes) and economical process (commonly used and relatively cheap chemicals are employed: NaOH and HCl). The final protein product can be provided as a dry powder or a wet paste for various product applications.

Figure 1:
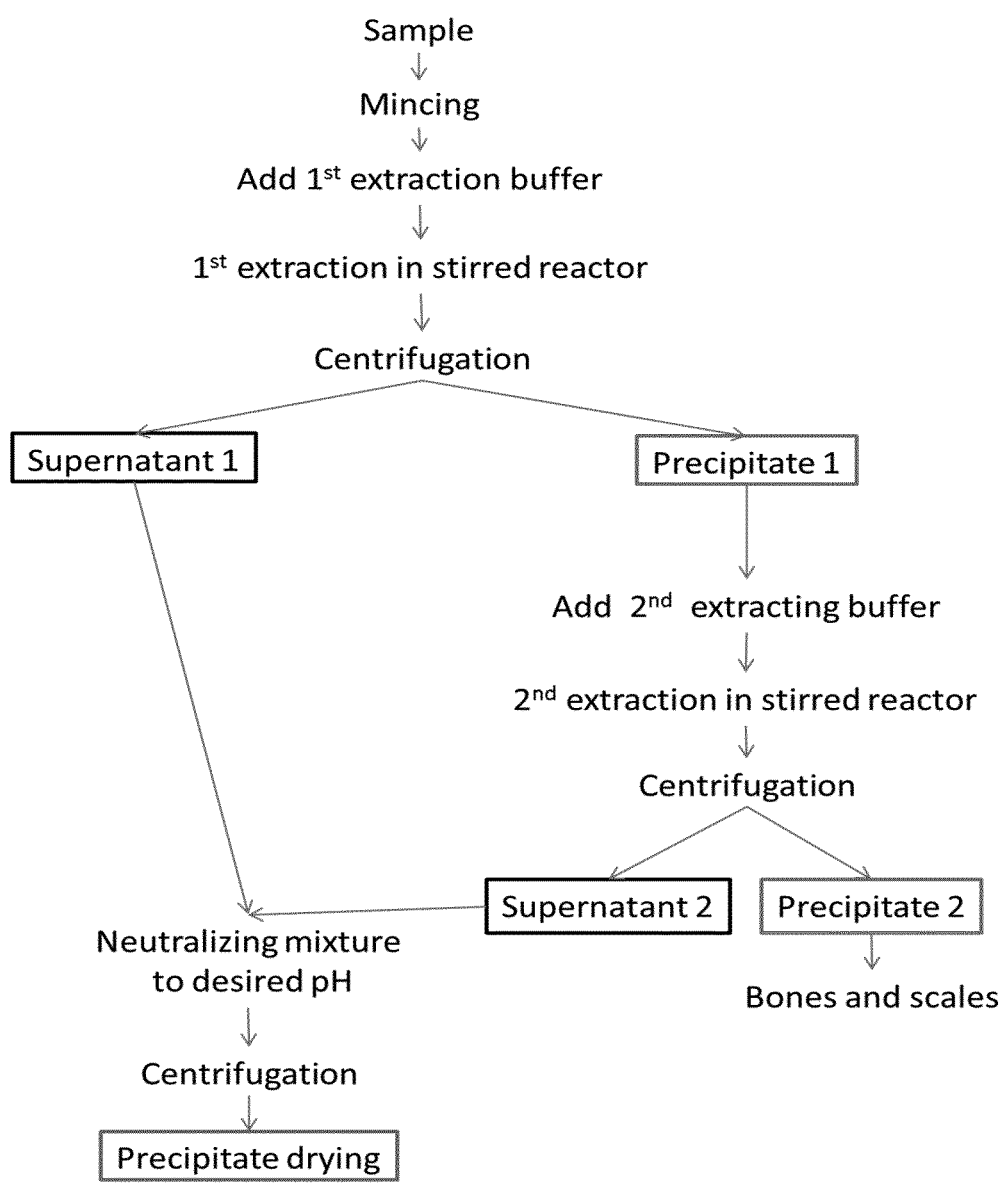
FIG. 1 illustrates a method of sequential isoelectric solubilisation according to the invention (left hand side) and a conventional single step isoelectric solubilisation method.
Figure 2:
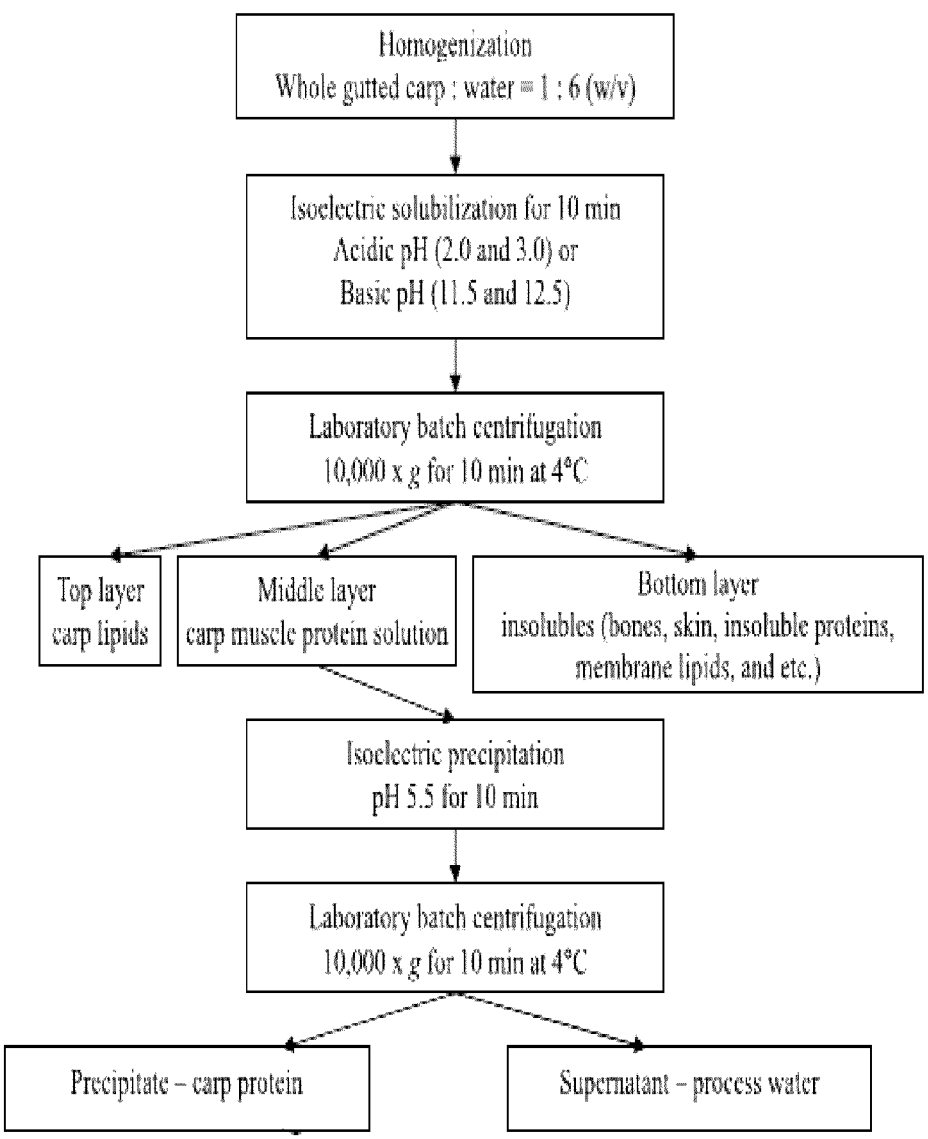
FIG. 2 illustrates a conventional single step isoelectric solubilisation method.

The process flow chart, compared with conventional ISP, is shown in FIG. 1:

Raw material is minced until a paste is obtained

The paste is mixed with a specific concentration and volume of NaOH or HCl (volume can be reduced if US is applied and depending on the raw material)

After the solubilization step an aqueous phase rich in soluble proteins is obtained (Supernatant 1), along with a non-soluble fraction composed of scales and bones and remaining insoluble proteins (Precipitate 1). Both phases can be separated by centrifugation, filtration or decantation.

Supernatant 1 can be directly dried by spray/freeze drying or concentrated by ultrafiltration. A second possibility is to drop the pH to a desired value to precipitate all the protein that can be recovered by filtration or centrifugation.

In the event that a valuable amount of protein remains in Precipitate 1, a second extraction step should be carried out. In this case the pellet is mixed with a known volume and concentration of either HCl or NaOH, depending on the first buffer employed; ideally the first buffer should be alkaline, followed by acid.

After this second extraction, Supernatant 2 is obtained, along with Precipitate 2.

Supernatant 1 and Supernatant 2 are mixed in a certain proportion which yields a final pH of 5.5, where the proteins precipitate and can be recovered by filtration or centrifugation.

The final product can be dried or preserved as wet paste for product application. The amino acid profile of the recovered protein is similar in terms of essential and non-essential amino acid content to that obtained from fillets, hence the nutritional value has been preserved.

At industrial scale both extractions will be carried out at the same time, using a pellet from a previous solubilisation step. Hence, the process duration will be comparable to conventional ISP.

Application of sequential extraction allows an increase in the protein recovery yield, in addition to a more economical and efficient use of reagents. To date NaOH and/or HCl have been used in a single standalone extraction step: first solubilisation and then precipitation by pH neutralization. In the present invention the reagents act as both solubilizing and neutralising agents, therefore an increased yield can be obtained using comparable amounts of reagents. Although the supernatant can be directly dried, it is preferable to precipitate the recovered proteins to reduce the amount of salt in the final product since sodium is dried and concentrated along with the protein. Therefore, following precipitation at weakly acidic pH (5-6) the salt remains in the supernatant and the protein obtained is low in sodium content.

The present invention is very flexible and adaptable since a variety of sources can be employed (meat, meat by-products, poultry, fish and fish by-products) and the parameters of the process (pH, solvent/sample ratio, extraction time and temperatures) can be modified according to the protein source. The present method can therefore be applied to a multitude of raw materials regardless of the source properties.

A second advantage of sequential extraction is that both acid and alkaline supernatants can be mixed to neutralize pH, so that the extracted protein can be precipitated and easily recovered. Both supernatants rich in soluble proteins are mixed in the right proportion to get a final blend with a pH value of 5.5; in this final step all recovered protein is precipitated again and it can be washed with slightly acidic water to remove the excess of salt formed. It has been demonstrated that minor amounts of proteins can remain soluble in the final supernatant after protein centrifugation; such proteins can be easily recovered and desalted by membrane filtration. Such a process allows a dramatic increase in protein extraction, without an increase in the volume of reagents used, since the alkali or acid previously used for neutralization or extraction is now used for extraction and neutralization.

As mentioned under the prior art review above, when US is employed in combination with conventional ISP, the yield is notably increased compared with ISP alone and indeed our experiments also demonstrated this (see Table 1 below). Specifically, in the present invention, US was employed to assist both the first and the second steps in the sequential ISP extraction. US conditions employed were 10 minutes of ultrasonic treatment, using a probe immersed in the solution and the amplitude used was either 20% or 60%. In the case of conventional ISP acid extraction, the recovery yield was 49%, and this was increased to 60% using US at an amplitude of 20%. In the case of conventional ISP alkaline extraction, recovery was 64% and this was increased to 87% using US. When the amplitude was increased to 60%, the recovery yields were further increased to 74% for acid extraction and 95% for alkaline. Importantly however, our sequential extraction method is able to recover 98% of total protein without US. The table below summarizes the yields obtained when sequential ISP is used, with and without US (two different US amplitudes are shown). Both types of sequential extraction are shown. It should be noted that the yields obtained in the first step of the sequential ISP extraction (listed under '$1^{st}$ extraction') are also the yields obtained with conventional ISP (assisted or not with US). Sequential ISP extraction refers to the combination of the first and second extraction steps which results in the final high yield, since the proteins which were not extracted in the first step are now extracted in this second step.

TABLE 1

Percentage of protein recovered using sequential ISP versus conventional ISP. Different small superscripts (a to d) denote significant differences ($p < 0.05$).

| | Acid-Alkaline extraction | | | Alkaline-Acid extraction | | |
|---|---|---|---|---|---|---|
| | 1$^{st}$ extraction HCl 0.1M | 2$^{nd}$ extraction NaOH 0.1M | Total recovery | 1$^{st}$ extraction NaOH 0.1M | 2$^{nd}$ extraction HCl 0.1M | Total recovery |
| Sequential ISP | 49.48 ± 0.84$^a$ | 49.23 ± 1.51$^a$ | 98.6%$^a$ | 64.05 ± 0.09$^d$ | 19.27 ± 1.19$^b$ | 83.3%$^c$ |
| Seq ISP US 20% | 60.31 ± 0.66$^b$ | 35.27 ± 8.18$^a$ | 95.5%$^a$ | 87.59 ± 3.3$^e$ | 4.86 ± 0.80$^d$ | 92.5%$^b$ |
| Seq ISP US 60% | 74.66 ± 5.25$^c$ | 19.00 ± 3.49$^b$ | 93.6%$^b$ | 94.71 ± 0.82$^f$ | 2.62 ± 2.30$^d$ | 97.3%$^a$ |

Since the required investment in ultrasonic systems is expensive, it is a high energy power consuming technology and is still not well established in current industrial processes, we propose that our sequential extraction process provides a significant competitive advantage over the use of US as it is cheaper, uses less energy and can be easily incorporated into current industrial processes.

In conclusion, the present invention proposes a sequential extraction process. To the best of our knowledge, sequential extraction has not previously been used to enhance the ISP technique and it is expected that it can be applied to raw materials suitable for processing by ISP such as meat, chicken and fish by-products.

Importantly, sequential extraction is a process that can be easily scaled, since just larger stirred reactors, and industrial scale decanters or separators (currently used in food industry) are needed to complete the process.

This technology provides an opportunity for fisheries to increase the profitability of their fish by-catches by implementing an economical and efficient process capable of generating protein-based added-value products.

The invention claimed is:

1. A method for recovery of protein from animal by-product by sequential isoelectric solubilisation of the animal by-product, the method comprising the steps of:
   isoelectric solubilisation of the animal by-product in one of an acid or alkali solution to provide a first solubilised protein fraction;
   separating the first solubilised protein fraction from unsolubilised animal by-product;
   isoelectric solubilisation of the unsolubilised animal by-product in another of the acid or alkali solution to provide a second solubilised protein fraction;
   separating the second solubilised protein fraction from unsolubilised animal by-product; and
   recovery of protein from the first and/or second solubilised protein fractions, wherein the protein from the first and second solubilised protein fractions are recovered by combining the first and second solubilised protein fractions in an amount to provide an acidic solubilised protein fraction having a pH of 5-6 to effect precipitation of the protein.

2. A method as claimed in claim 1 in which the animal by-product is fish by-product.

3. A method as claimed in claim 1 in which the fish by-product includes heads, skin, internal organs, fins or tails.

4. A method as claimed in claim 1 in which the animal by-product is treated with ultrasound during one or both of the isoelectric solubilisation steps.

5. A method as claimed in claim 1 in which the isoelectric solubilisation steps are carried out in a stirred reactor.

6. A method as claimed in claim 1 in which the solubilised protein fraction is separated from the unsolubilised animal by-product by means of centrifugation.

7. A method as claimed in claim 1 in which the first isoelectric solubilisation step is carried out on a first batch of animal by-product, and the second isoelectric solubilisation step is carried out on unsolubilised animal by-product from a second batch of animal by-product, and wherein the two isoelectric solubilisation steps are carried out simultaneously.

8. A method as claimed in claim 1 in which the animal by-product is size-reduced prior to the isoelectric solubilisation step.

9. A method according to claim 1 in which the animal by-product is fish by-product, and in which the fish by-product is homogenised prior to the first isoelectric solubilisation step, and in which the protein is precipitated by combining the first and second solubilised protein fractions proportionally to provide a weakly acidic solubilised protein fraction having a pH of 5-6.

* * * * *